United States Patent Office 3,794,464
Patented Feb. 26, 1974

---

3,794,464
ALKOXYLATED ALIPHATIC POLYETHYLEN-IMINES TO INHIBIT OZONE FADING OF DYED POLYAMIDES
Robert Alden Lofquist, Peter Reginald Saunders, and Gene Clyde Weedon, Richmond, Va., assignors to Allied Chemical Corporation, New York, N.Y.
No Drawing. Filed Feb. 4, 1972, Ser. No. 223,772
Int. Cl. D06p 5/02
U.S. Cl. 8—165     4 Claims

ABSTRACT OF THE DISCLOSURE

When from about 0.3% to about 5% of polytertiary amines formed from the reaction of polyethylenimine with alkylene oxides are coated on nylon fiber, or are added to the dyebath, improved dyefastness is achieved compared to an untreated dyed nylon fiber when this fiber is exposed to ozone.

BACKGROUND OF THE INVENTION

The object of this invention is to reduce or prevent the fading of dyed nylon fabrics, such as nylon carpets, caused by ozone.

Ozone is generally present in air at sea level at concentrations of only 1 to 5 parts per hundred million (p.p.h.m.). Only under conditions of heavy smog, where sunlight acts on a combination of unburned hydrocarbons from gasoline and oxides of nitrogen does the ozone concentration exceed these concentrations. However, even at the low ozone concentrations, if the humidity is high enough (e.g., over 75% R.H.) ozone fading occurs.

Ozone is a molecular form of oxygen which has three atoms of oxygen instead of the normal two atoms of oxygen per molecule. It is a very powerful oxidizing agent; and a strong electrophilic reagent, that is, it searches out and attacks electron pairs such as exist with carbon-carbon double bonds.

Dyes have a multiplicity of double bonds, and perhaps for this reason are very sensitive to ozone.

The dyes in nylon which are most seriously attacked are those which are mobile in the nylon, such as disperse dyes. Cationic dyes are also susceptible. The most sensitive disperse dyes are usually blue anthraquinone dyes, although there is evidence that under high humidity and high ozone concentration, almost all dyes are affected by ozone.

Basic anthraquinone dyes, such as C.I. Basic Blue 47, are subjected to ozone fading as shown in the examples. Typical anthraquinone dyes are shown by U.S. 2,900,216. Analysis of C.I. Basic Blue 47 or Astrazon Blue 3RL has shown it is quaternized from the compound labeled 2 in the list of compounds on page 1 of U.S. 2,900,216. Thus, the structure would be:

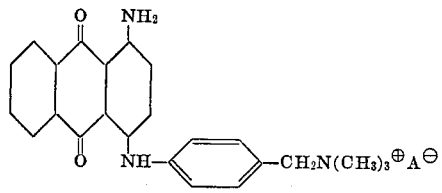

where A is an anion, such as Cl⊖. The 1963 Supplement of the Colour Index also indicates Astrazon Blue 3RL is an anthraquinone.

A typical disperse dye is disperse Blue 3 with a structure shown at column 1, line 45 of U.S. Pat. 3,716,328.

High humidity is necessary to cause noticeable ozone fading. Apparently moisture provides the dye sufficient mobility to diffuse to the surface of the yarn where the destruction of the dye occurs.

A number of chemicals have been called anti-ozonants in the literature which protect rubber from ozone. Examples are paraphenylenediamine derivatives, and dihydroquinoline derivatives. In nylon, however, these chemicals seriously discolor the yarn, especially after exposure to light, severely limiting the use of such materials.

SUMMARY OF THE INVENTION

A method and composition has been found for improving the fastness of dyes when exposed to ozone in polycarbonamide fibers. The method consists of exposing the fibers to ozone in the presence of a poly-tertiary amine formed by the reaction of alkylene oxides with polyethylenimines in or on the fiber. The preferred alkylene oxides are ethylene oxide, propylene oxide and butylene oxide. The preferred molecular weight of the polyethylenimine is from about 100 to about 60,000, more preferably from about 500 to about 30,000. The preferred ratio of alkylene oxide to amine in the poly-tertiary amine is between about 0.2 to 1 and 2.0 to 1 (preferably between 0.2 to 1 and 1.5 to 1) moles oxide to atoms nitrogen or equivalents of amine.

Polyethylenimine is a highly branched polyamine produced by the acid catalyzed polymerization of the monomer ethylenimine. The polymer is composed of units which have two carbon atoms per nitrogen, and these units are randomly distributed in the approximate ratios of one primary amino nitrogen/two secondary amino nitrogens/one tertiary amino nitrogen. This distribution gives rise to what is believed to be a spheroid shaped polymer molecule which is composed of many branched segments with the tertiary amino nitrogens being the branching sites and the primary amino nitrogens being the terminal groups of each segment. The primary and secondary amino nitrogens comprise reaction sites whereby the polyethylenimine can be conveniently modified.

The polytertiary amines of this invention can be prepared by well-known methods such as those shown in U.S. 3,071,427, to Buehler et al., column 5, lines 56–72.

One of these polytertiary amines or mixtures of them can be coated on nylon fiber in amounts from 0.3 to about 5% based on the weight of the fiber. Alternatively, the above compounds can be added to the dye bath so as to impregnate the yarns with 0.6% to 5% of the compounds.

The rate of fading of the dye in nylon fibers, particularly disperse or cationic dyes, is substantially reduced by the incorporation or coating of these polytertiary amines.

DESCRIPTION OF THE PREFERRED EMBODIMENTS

Some of the preferred embodiments of this invention are set forth in the following examples. The method of testing for ozone fading is similar to the AATCC Test 129–1968 set forth on page 334/15 of The Journal of American Association of Textile Chemists and Colorists, July 30, 1969, vol. 1, No. 16, in an article entitled, "A New Test Method for Ozone Fading at High Humidity," by Victor S. Salvin.

The method and the means of measuring the loss of dye consists in dyeing the yarn with a selected dye or dyes, exposing it to ozone at a concentration of 80 parts per hundred million in a test chamber together with a control nylon sample which was dyed an avocado shade. The control sample is examined periodically until the resulting color corresponds to that of the Standard of Fading (one cycle). It has been found that one cycle is completed when the internal standard has faded sufficiently to give a ΔE of 2.8, compared to the unexposed standard.

ΔE is a measure of the change of color between two samples, a smaller ΔE being a closer match, or less fading of one sample compared to the second sample.

This color difference, ΔE, was measured with a Hunterlab Color Difference Meter. This instrument measures color as seen in average daylight in a manner similar to the way in which the human eye responds to the stimulus of color. Experimentation has shown that the eye can match any color with a combination of three "primary" colored lights, and therefore, that any color can be specified by a three dimensional identification. The Color Difference Meter measures the light reflected by a specimen through filters that correspond to the three "primary" lights. These measurements made correspond to the way the average human eye responds to light.

$$\Delta E = \sqrt{(\Delta L)^2 + (\Delta a)^2 + (\Delta b)^2}$$

where

ΔL is $L_1-L_2$;
Δa is $a_1-a_2$;
Δb is $b_1-b_2$;
L, a, and b are readings on the Hunterlab Color Difference Meter;
L is a 100 to 9 reading of white to black;
a indicates redness when positive, gray when zero, and green when negative; and
b indicates yellow when positive, gray when zero and blue when negative.

The following are examples of the subject additives and their behavior on being coated onto yarn, dyed and exposed to ozone, or on being coated on dyed sleeves and exposed to ozone.

Example I

One thousand grams of polycaprolactam of about 60 formic acid relative viscosity, containing about 90 equivalents of sulfonate as sodium sulfoisophthalic acid, having about 80 carboxyls and 20 amines per $10^6$ grams of polymer were spun into yarn at a spinning temperature of 280° C., plied and drawn at a 3.2 draw ratio into a 140 filament 2100 total denier yarn. A commercial aqueous spin finish was applied to the yarn before drawing. The filaments had a Y cross-section with a 3.2 modification ratio.

This yarn, and a yarn made and spun in the same manner, but with an aqueous spin finish containing about 8% of propoxylated polyethylenimine. The polyethylenimine has a molecular weight of about 600 and manufactured by Dow Chemical Corporation and sold as Montrek 6. The Montrek 6 was propoxylated until there was 0.67 molecule of propylene oxide per atom of nitrogen in the product. The finish pickup was 10% O.W.F. (on weight of fiber).

Both yarns were knitted into sleeves. The sleeves were heat set by steam treating in an autoclave at 230° F. for five minutes followed by three 10-minute cycles of steam treatment at 260° F.

The sleeves were dyed to a moss green in a dye bath composed as follows:

0.3% Sevron Yellow 8GMF (Du Pont) CI Basic Yellow 53
0.25% Astrazon Blue 3RL (Verona) CI Basic Blue 47
2.0% Hipochem PND–11 amine salt of alcohol ester by Highpoint Chemical Company
1.0% Hipochem CDL–60 nonionic surfactant by Highpoint Chemical Company (chemical structure not available)

and sufficient monosodium and/or disodium phosphate to adjust the pH to 7.0±0.2.

The percents are based on weight of fabric. The liquor to fabric ratio was 40 to 1. Astrazon Blue 3RL is a cationic blue dye known to be sensitive to ozone.

The dyed sleeves were then exposed to three cycles of ozone in an atmosphere of about 80 p.p.h.m. of ozone at a temperature of 104° F. at a relative humidity of at least 95%. A cycle is that exposure which is completed when the internal nylon standard dyed olive 1 has faded sufficiently to give a ΔE of 2.8. Measurement of ΔE is discussed under "Description of the Preferred Embodiments."

The results of ozone exposure are tabulated below:

| Yarn | 3 cycles | |
|---|---|---|
| | ΔE | ΔL |
| Control nylon | 14.4 | 9.5 |
| Nylon with propoxylate polyethylenimine in the finish | 11.7 | 7.4 |

Example II

Polymer made from caprolactam, having a formic acid relative viscosity of 46, about 81 sulfonic groups from sodium sulfoisophthalate, about 90 carboxyls and about 25 amine ends per million grams of polymer, was spun into yarn. The yarn, coated with a commercially aqueous spin finish was drawn at a draw ratio of 2.9. The yarn had a Y cross-section with a 3.2 modification ratio and each filament had a denier of 15.

The yarn was chopped into 7 inch lengths, carded and spun into stable yarn having a cotton count of 2. The yarn was knitted into sleeves, and heat set by steam treating in an autoclave at 230° F. for five minutes followed by three 10 minute cycles of steam treatment at 260° F.

The sleeves were dyed to a moss green in a dye bath composed as follows:

0.3% Sevron Yellow 8GMF (Du Pont)
0.25% Astrazon Blue 3RL (Verona)
2.0% Hipochem PND–11
1.0% Hipochem CDL–60 and monosodium and/or disodium phosphate to adjust the pH to 7±0.2.

The sleeve was cut into sections about 5 inches long and each section was weighed. The sleeves were then dipped in the methanol solutions shown below for 20 minutes. The sleeves were then removed from the solutions, dried and reweighed. The amount of material coated on the sleeves from each solution was based on the difference in weight between the coated and the uncoated sleeves, compared to the control.

The sleeves were then exposed to three cycles of ozone in an atmosphere of about 80 parts per hundred million of ozone at a temperature of 104° F., at a relative humidity of at least 95%. A cycle is that exposure which is completed when the internal nylon standard, dyed olive I, has faded sufficiently to give a ΔE of 2.8. The measurement ΔE is discussed under "Description of Preferred Embodiments."

The solutions, the amount of coating and the results of ozone exposure are listed below:

| | Percent pickup | ΔE |
|---|---|---|
| (a) Control, 200 ml. of methanol | 0 | 11.0 |
| (b) 3 grams of XD 1037.3 (ethoxylated polyethylenimine from Dow Chemical) | 1.58 | 0.4 |
| (c) 1 gram of XD 1037.3 (as above) | 0.51 | 0.8 |
| (d) 3 grams of XD 1038.6 (propoxylated polyethylenimine from Dow Chemical) | 1.48 | 0.7 |
| (e) 1 gram of XD 1038.6 (as above) | 0.57 | 0.6 |

NOTE.—The precursor polyethylenimine has a molecular weight of 40–60,000. The ratio of moles of oxide to equivalents of amine in XD 1037.3 is 0.75 to 1.0, in XD 1038 is 1.08 to 1.0.

EXAMPLE III

Dyed sleeves similar to those described in Example II were coated with the chemicals in solution listed below, and exposed to ozone as described in Example II:

| | Percent pickup | ΔE |
|---|---|---|
| (a) Control, 200 ml. ethanol | 0 | 7.9 |
| (b) 0.5 g. ethoxylated Montrek 6, 0.9 mole ethylene oxide per nitrogen equivalent | 0.73 | 2.5 |
| (c) 1.0 gram propoxylated Montrek 18, 1.0 mole propylene oxide per nitrogen equivalent | 1.45 | 1.0 |
| (d) 1.0 gram butoxylated Montrek 6, 1.37 moles butylene oxide per nitrogen equivalent | 1.54 | 0.9 |
| (e) 0.5 gram butyoxylated Montrek 6 (as above) | 0.94 | 1.3 |

NOTE.—Montrek 18 is a polyethylenimine having a molecular weight of about 1,800 and is also manufactured by Dow Chemical.

EXAMPLE IV

Polycaprolactam was spun as in Example I but with various aqueous spin finishes. All finishes were 20% "solids" and 80% water. Of the "solids," 40% were the additives listed below.

The yarns were drawn, knitted into sleeves, autoclaved, dyed, and exposed to ozone. The results were as follows:

| Additive | Finish pickup, percent | ΔE after 3 cycles |
|---|---|---|
| None | 0 | 12.2 |
| Ethoxylated Montrek 6 (PEO/PEI=0.9)[1] | 5.1 | 11.4 |
| Ethoxylated Montrek 6 (PEO/PEI=0.9)[1] | 9.8 | 8.3 |
| Propoxylated Montrek 18 (PPO/PEI=1.0)[1] | 9.8 | 9.4 |

[1] The propoxylated Montrek 18 has a ratio of 1 mole of propylene oxide per equivalent of nitrogen, and the ethoxylated Montrek 6 has the analogous ratio, as shown.

EXAMPLE V

Sleeves from the same yarn as described in Example II were cut into 5-inch long sections soaked in the following solutions. They were then exposed to ozone as in Example II.

| Solution | Percent add on | 3 cycles ΔE |
|---|---|---|
| 1.0 gram propoxylated tetraethylenepentamine | 1.1 | 1.8 |
| 0.5 gram propoxylated tetraethylenepentamine | 0.5 | 1.3 |
| 1.0 gram butoxylated tetraethylenepentamine | 1.1 | 2.2 |
| 0.5 gram butoxylated Polyamine D | 0.6 | 1.4 |
| Control | 0 | 9.5 |

NOTE.—The tetraethylene pentamine and the polyamine D were obtained from Union Carbide Chemical Corporation and are described in their Chemicals and Plastics Physical Properties brochure.

The mole ratio of propylene oxide to nitrogen in the propoxylated tetraethylenepentamine was 0.29. The ratio of moles butylene oxide to equivalents of nitrogen in the butoxylated tetraethylenepentamine was 0.23. The ratio of moles of butylene oxide to moles of polyamine D was 2.3.

We claim:

1. In a method for coating polycarbonamide fibers dyed with anthraquinone dyes, the improvement comprising coating the dyed fiber with a highly branched polyimine with a ratio of about one primary amino nitrogen to two secondary nitrogens to one tertiary amino nitrogen said polyimine being, produced by the acid catalyzed polymerization of the monomer ethylenimine, reacted with an alkylene oxide selected from the group consisting of ethylene oxide, propylene oxide and butylene oxide to form a polyethylenimine having a molecular weight of from about 500 to about 60,000 and a ratio of alkylene oxide moles in the polytertiary amine to equivalents of amine in the polytertiary amine of between about 0.2 to 1 and about 2.0 to 1 mole oxide to the equivalents of amine, so that from about 0.3 to about 5 percent on weight of fiber of said polyethylenimine remains on said fiber, whereby said dyed polycarbonamide fibers have improved fastness of dye when exposed to ozone.

2. The method of claim 1 wherein said anthraquinone dyes are disperse dyes.

3. The method of claim 1 wherein said anthraquinone dyes are basic dyes.

4. The composition of claim 1 wherein said polyethylenimine has a molecular weight from about 500 to about 30,000.

References Cited

UNITED STATES PATENTS

| 2,409,325 | 10/1946 | Ward et al. | 8—165 |
| 3,071,427 | 1/1963 | Buehler | 8—22 |
| 3,096,139 | 7/1963 | Hindle | 8—21 A |
| 3,716,328 | 2/1973 | Mayer | 8—165 |

OTHER REFERENCES

Salvin, Amer. Dyestuff Rep., Jan. 6, 1964, pp. 12–19.

DONALD LEVY, Primary Examiner

U.S. Cl. X.R.

8—39, 178 R